Patented Apr. 26, 1932

1,855,413

UNITED STATES PATENT OFFICE

IWAN OSTROMISLENSKY, OF NEW YORK, N. Y., AND WILLIS A. GIBBONS, OF MONTCLAIR, NEW JERSEY, ASSIGNORS TO THE NAUGATUCK CHEMICAL COMPANY, OF NAUGATUCK, CONNECTICUT, A CORPORATION OF CONNECTICUT

PROCESS FOR PRODUCING VITREOUS POLYMERIZED STYROL FROM MIXTURES OF STYROL WITH MATERIALS

No Drawing.    Application filed January 16, 1931. Serial No. 509,266.

The present application is a continuation in part of our copending application Serial No. 711,585, filed May 7, 1924.

This invention relates to processes for producing vitreous polymerized styrol from mixtures of styrol with materials, and is more particularly directed to producing such polymerized product from mixtures of styrol with organic materials, such for example as a solution of styrol in an organic solvent.

The principal object of the invention is to provide a simple efficient process for rapidly polymerizing styrol to obtain a useful vitreous product.

The invention accordingly consists of a process for producing vitreous polymerized styrol which comprises heating a composition containing at least approximately 40% of styrol at approximately 80–200° C. and at substantially atmospheric pressure until polymerization of the styrol occurs.

The term "vitreous polymerized styrol" as used herein is intended to include that polymerized styrol which is tough and transparent and which may be practically colorless. It also shows a dull fracture. It may be cut with a knife to form thin films or parings. The term excludes the brittle friable, easily pulverized resinous product which shows a bright glassy fracture, has a brownish color, a lower melting point than the vitreous type, and when cut with a knife chips or crumbles.

The process of Ostromislensky set forth in Patent No. 1,703,950, issued March 5, 1929, shows that polymerization of styrol in solution in ethyl benzol and other hydrocarbons may be accomplished, but the product is not vitreous polymerized styrol. On the other hand it is the brittle resinous product referred to above. It has been found in accordance with the present invention, however, that at certain concentrations a temperature exists for various mixtures of styrol with other substances at or below which the mixture may be polymerized under atmospheric pressure to yield the desired tough, transparent vitreous polymerized styrol.

As one example of the process, 10 kilos of e. g. the product obtained directly from the tube furnace and consisting chiefly of styrol and unchanged ethyl benzol, together with small amounts of benzol, toluol, xylol, and other higher boiling aromatic hydrocarbons, as described in the patent of Ostromislensky & Shepard, No. 1,541,175, issued June 9, 1925, are preferably mixed with a retarding agent, say 1% of trinitrobenzol or quinone by weight based on the styrol present as described in Patent No. 1,550,323, issued August 18, 1925. This mixture is then subjected to a fractional distillation which is carried out conveniently to produce three main fractions, the first two fractions being distilled at atmospheric pressure, and the third fraction being distilled in a vacuum. In carrying out this fractionation the mixture is heated and passed into a suitable fractionating column and the first fraction is selected as that which passes over up to approximately 132° C. The second fraction is that which passes over preferably between 132–138.8° C. A vacuum is then applied of 24 mm. and the third fraction is that which passes over up to approximately 65.3° C. The first fraction mentioned above will generally contain about 3% of unpolymerized styrol. The second fraction will generally contain about 12–15% unpolymerized styrol. The third fraction will generally contain about 50% styrol. The materials other than styrol in the second fraction are apparently hydrocarbons whose nature depends on what material is used as the starting point in the above Ostromislensky-Shepard case. For example, if ethyl benzol is used as the initial material, it will be present as the chief material other than styrol. The materials other than styrol in the third fraction apparently consist largely of ethyl benzol with a small amount of xylol and higher boiling hydrocarbons, when ethyl benzol is used as the initial material.

The third fraction containing approximately 50% styrol, the remainder being chiefly unchanged ethyl benzol with a small amount of xylol and higher boiling hydrocarbons, as above mentioned, may then be heated to polymerize the styrol preferably in a vessel, open to the atmosphere through a suitable reflux condenser, the vessel being heated by a bath maintained at 135–140° C. for 100 to 48 hrs. If this polymerization is carried out in a closed vessel, for example an autoclave, the resulting product may be resinous and consequently not the desired vitreous polymerized styrol.

In order to recover vitreous polymerized styrol from the mass it is evaporated in vacuum directly. It is convenient to start the evaporation with a nearly complete vacuum but at room temperature, then allow the temperature to rise gradually, finishing at around 130° C. The heating is preferably continued at this temperature until the product loses only a few tenths of 1% in approximately 1 hour. That is, the material is dried to practically constant weight. In carrying out this evaporation the temperature preferably should not rise above 135–140° C. while the styrol content is below 96%. Otherwise the saturated hydrocarbons present may react with some unpolymerized styrol to give a resinous product.

The product resulting from the above process and similar processes herein described is a vitreous polymerized styrol having the properties described in the patent of Ostromislensky, No. 1,703,950, issued March 5, 1929.

As another example a solution containing ethyl benzol and approximately 84% of styrol is heated with access of air at atmospheric pressure with a reflux condenser for 25 hrs. in a vessel heated by a bath maintained at approximately 175° C. At the end of that time the reflux condenser is removed and heating continued to remove any volatile matter. At the end of this time vitreous polymerized styrol is obtained.

As another example of the process of styrol containing approximately 5% of hydrocarbon impurity as evidenced by a bromine titration is heated in an open vessel with access of air through a reflux condenser in a bath maintained at approximately 200° C. for 8 hours, at the end of which time the reflux condenser is removed and heating is continued to remove any volatile impurities. At the end of this latter heating period vitreous polymerized styrol is obtained.

As further examples, 45% solutions of styrol were heated at 100° C. for 120 hours and at 115° C. for 72 hours, in each case producing a solution of the tough styrol polymer. The solutions of the unpolymerized styrol may be those in any suitable hydrocarbon solvent such as ethyl benzol. The conditions for polymerization are otherwise the same as specified in the preceding examples.

It will be noted in accordance with the above examples that the temperature at which polymerization is carried out varies in accordance with the percentage of styrol contained in the mixture. Our observations show that the practical limits of temperature are from 80° C.–200° C. for concentrations of styrol varying from 40% upwards to 95% styrol.

Instead of carrying out the fractional distillation to obtain an ethyl benzol solution containing a high percentage of styrol, that is 40% or over, a solution containing less than 40%, as for example the product of the Ostromislensky-Shepard process as it is secured from the tube, may be mixed with styrol either pure or in a more concentrated solution to bring the solution to 40% or more concentration. This solution may then be polymerized as indicated above or as described below. Another method is to dissolve vitreous polymerized styrol in the above-described dilute solution such as that of the Ostromislensky-Shepard process to give a final solution of 40% or more of combined styrol and meta styrol. Polymerization of this solution is then conducted under conditions described above or below.

In carrying out the above evaporation, in case high boiling aromatic hydrocarbon constituents are present, which are difficult to remove with vacuum at 135–140° C. the evaporation process may be varied somewhat as follows: After evaporation, partially in vacuum, the product is dissolved in a low boiling solvent such as benzol or carbon tetrachloride, and the evaporation is then finished in the usual way. The evaporation of the low boiling solvent tends to carry off the higher and leave the product in a pure state. Whenever evaporation methods are used for carrying out this process, the absence of air is desirable, otherwise oxidation, with a resultant yellow color in the final product, is apt to take place.

Instead of carrying out the evaporation as indicated above, in connection with the preferred example, polymerized styrol may be precipitated by adding a volume of ethyl alcohol about equal to that of the solution. The precipitated mass is gummy and requires extracting several times with hot alcohol. It is then preferably dissolved in benzol and reprecipitated with alcohol. After sufficient extraction with alcohol it is freed from the latter by heating in an oven at a low temperature, 100–110° C. approximately. The product thus resulting is vitreous polymerized styrol corresponding to that obtained by the embodiment above described.

It will be understood that in the various examples given herein part of the heating to effect polymerization may be accomplished in an open vessel without reflux condenser so that polymerization and evaporation of unpolymerized or volatile material will proceed simultaneously. In this case the period of polymerization may be shortened but at the same time the yield of the polymerized product will be lessened. Or the polymerization may be carried out either in a closed vessel provided with a reflux condenser or an open vessel permitting of evaporation as above described. The operation may be stopped before the entire styrol content of the mixture has been polymerized, and the unpolymerized or other volatile materials remaining may be removed by distillation including that with steam; or the polymerized material may be separated by the addition of alcohol as herein described. In these cases also of course the yield of polymerized styrol will be lower. It will be understood that the time and temperature limits herein given are intended for substantially complete polymerization of the original styrol.

Although the process has been described employing as a starting material the solution of styrol obtained by the Ostromislensky-Shepard process, it will be noted that it may also be carried out where the solvent instead of being in large part ethyl benzol is benzol toluol, xylol, or mixtures of one or more of these with one another.

As many apparently widely different embodiments of this invention may be made without departing from the spirit thereof, it will be understood that we do not intend to limit ourselves to the specific embodiments herein set forth except as indicated in the appended claims.

Having thus described our invention, what we claim and desire to protect by Letters Patent is:

1. A process for producing tough vitreous polymerized styrol from impure raw material, which comprises heating a styrol solution in aromatic hydrocarbons and containing at least approximately 40% of styrol at approximately 80–200° C. with access of air until polymerization of the styrol to the said tough vitreous modification occurs, and substantially completely removing unpolymerized styrol.

2. A process for producing tough vitreous polymerized styrol from impure raw material, which comprises heating a styrol solution in aromatic hydrocarbons and containing at least approximately 40% of styrol at approximately 80–200° C. at atmospheric pressure for not substantially less than approximately eight hours until polymerization of the styrol occurs, and removing materials other than polymerized styrol from the solution to produce said tough vitreous polymerized styrol.

3. A process for producing tough vitreous polymerized styrol from impure raw material, which comprises heating a styrol solution containing ethyl benzol as a solvent and at least approximately 40–95% of styrol in a vessel having access of air and at atmospheric pressure at a temperature of approximately 80–200° C. for not substantially over approximately one hundred and fifty hours until polymerization of the styrol to the said tough vitreous modification occurs.

4. A process for producing tough vitreous polymerized styrol, which comprises heating a styrol solution containing ethyl benzol as a solvent and at least 40–95% styrol at atmospheric pressure and with access of air with a return condenser at approximately 80–200° C. for 150 to 8 hours, and distilling off the solvent to produce said trough vitreous polymerized styrol.

5. A process for producing tough vitreous polymerized styrol, which comprises concentrating by fractional distillation a dilute solution of styrol in a liquid hydrocarbon of lower boiling point than styrol until it contains approximately 40–50% of styrol, heating the concentrated solution at 140° C. with access of air at atmospheric pressure with a reflux condenser for 100 hours, removing the reflux condenser, continuing the heating to remove the solvent, until said tough vitreous polymerized styrol is produced.

6. A process for producing tough vitreous polymerized styrol, which comprises adding to a hydrocarbon solution containing less than 40% styrol sufficient vitreous polymerized styrol to make a mixture in which the sum of the styrol and vitreous polymerized styrol content shall be more than 40%, and heating the mixture with access of air at approximately 80–200° C. for 150–8 hours approximately until polymerization of the styrol to the said tough vitreous modification occurs.

7. A process for producing tough vitreous polymerized styrol from a mixture of styrol and high boiling liquid hydrocarbons, which comprises heating said mixture containing at least approximately 40% of styrol at approximately 80–200° C. for 150–8 hours under atmospheric pressure approximately until polymerization of the styrol to the tough vitreous modification occurs, partially evaporating the resultant polymerized styrol, adding a low boiling solvent of said high boiling hydrocarbons thereto, and continuing the evaporation to produce tough vitreous polymerized styrol.

8. A process for producing tough vitreous polymerized styrol from a mixture of styrol and high-boiling liquid hydrocarbons which comprises heating said mixture containing at least approximately 40% of styrol at approximately 80–200° C. under atmospheric pressure until polymerization of the styrol to the tough modification occurs, precipitating the polymerized styrol from the resulting mixture by an organic solvent in which it is insoluble, extracting said precipitate with a solvent for the impurities, dissolving and reprecipitating the purified material, and heating at a temperature above the boiling points of the extraction and dissolving agents to remove said agents and to recover said vitreous polymerized styrol.

9. A process for producing tough vitreous polymerized styrol from a mixture of styrol and high-boiling liquid hydrocarbons which comprises heating said mixture containing at least approximately 40% of styrol at approximately 80–200° C. under atmospheric pressure until polymerization of the styrol to the tought modification occurs, precipitating the polymerized styrol from the resulting mixture by alcohol, removing impurities from the precipitate by extraction, dissolution and reprecipitation, and heating at approximately 100–110° C. to remove residual dissolution and extracting agents and to recover said vitreous polymerized styrol.

Signed at New York, county and State of New York, this 30th day of September, 1931.

IWAN OSTROMISLENSKY.

Signed at Passaic, county of Passaic, State of New Jersey, this 2nd day of October, 1931.

WILLIS A. GIBBONS.